United States Patent
Yeo (10) Patent No.: US 10,259,482 B2
(45) Date of Patent: Apr. 16, 2019

(54) BRAKING DEVICE FOR PORTABLE CART

(71) Applicant: Shin Dong Yeo, Daegu (KR)

(72) Inventor: Shin Dong Yeo, Daegu (KR)

( * ) Notice: Subject to any disclaimer, the term of this patent is extended or adjusted under 35 U.S.C. 154(b) by 0 days.

(21) Appl. No.: 15/792,062

(22) Filed: Oct. 24, 2017

(65) Prior Publication Data
US 2018/0050717 A1 Feb. 22, 2018

Related U.S. Application Data (63) Continuation of application No. PCT/KR2017/003049, filed on Mar. 22, 2017.

(30) Foreign Application Priority Data

Mar. 25, 2016 (KR) ......................... 10-2016-0035944

(51) Int. Cl.
- *B62B 5/04* (2006.01)
- *B62B 3/02* (2006.01)

(Continued)

(52) U.S. Cl.
CPC .............. *B62B 5/0461* (2013.01); *B62B 3/02* (2013.01); *B62B 5/04* (2013.01); *B62B 5/0433* (2013.01);

(Continued)

(58) Field of Classification Search
CPC ... B62B 5/0461; B62B 5/0433; B62B 5/0476; B62B 5/04; B62B 9/082; B62B 9/087;

(Continued)

(56) References Cited

U.S. PATENT DOCUMENTS

| 5,579,871 A | * | 12/1996 | Emmrich | ............ B60B 33/0042 16/35 R |
| 2002/0074193 A1 | * | 6/2002 | Cheng | ..................... B60T 1/005 188/31 |

(Continued)

FOREIGN PATENT DOCUMENTS

| JP | 2003-104208 A | 4/2003 |
| KR | 20-0196525 Y1 | 9/2000 |

(Continued)

OTHER PUBLICATIONS

International Search Report issued for corresponding International Patent Application No. PCT/KR2017/003049, dated May 8, 2017, with an English translation.

*Primary Examiner* — Xuan Lan Nguyen
(74) *Attorney, Agent, or Firm* — Myers Wolin, LLC (57) ABSTRACT

A braking device including: a loading plate; a pair of front wheels and a pair of rear wheels; a handle provided with clamping units; buffer units installed at the loading plate; and a braking unit that includes: a plurality of engaging grooves formed along a rim of a circular recesses; a brake bar disposed between the rear wheels; an actuating link supported by the brake bar and connected to a hinge portion; a connecting link connected to the actuating link by an interlocking bar; a connecting spring connected to the brake bar and the interlocking bar, a push switch fixed at an upper side of the connecting link, and a foot brake pedal fixed at an upper side of the push switch and has a top surface exposed at the top of the loading plate.

9 Claims, 11 Drawing Sheets

(51) Int. Cl.
*F16D 51/00* (2006.01)
*F16D 63/00* (2006.01)

(52) U.S. Cl.
CPC ............ B62B 5/0476 (2013.01); *F16D 51/00* (2013.01); *F16D 63/006* (2013.01); *F16D 2051/008* (2013.01)

(58) Field of Classification Search
CPC ... F16D 51/00; F16D 63/006; F16D 2051/008
See application file for complete search history.

(56) References Cited

U.S. PATENT DOCUMENTS

| | | | |
|---|---|---|---|
| 2007/0045055 A1* | 3/2007 | Lan ........................... | B62B 9/08 188/20 |
| 2008/0174081 A1* | 7/2008 | Wu ........................... | B62B 3/02 280/47.34 |

FOREIGN PATENT DOCUMENTS

| | | |
|---|---|---|
| KR | 20-2012-0003994 U | 6/2012 |
| KR | 10-1355522 B1 | 1/2014 |
| KR | 10-1452757 B1 | 10/2014 |

\* cited by examiner

BRAKING DEVICE FOR PORTABLE CART

CROSS REFERENCE TO RELATED APPLICATIONS

This application is a continuation of PCT/KR2017/003049, filed on Mar. 22, 2017, and claims priority from Korean Patent Application No. 10-2016-0035944 filed on Mar. 25, 2016 in the Korean Intellectual Property Office, the disclosure of which is incorporated herein by reference in its entirety.

TECHNICAL FIELD

The present invention relates to a braking device of a portable cart, and more particularly, to a braking device of a portable cart, which is provided with a foot brake pedal, operable in a one-touch manner, at an upper rear side of a loading plate where a handle is installed in the vicinity of a user, in consideration of usability, and can thus allow the cart to be braked with ease and convenience by the foot of a user, can prevent the foot brake pedal from being interfered with goods loaded on the loading plate during the driving of the cart, and can visually inform the user of the braking of the cart when the cart is being braked.

BACKGROUND ART

A cart for loading and carrying goods at a post office, a warehouse, or the like is normally provided with a loading plate for loading goods at the bottom of the main body of the cart, (front and rear wheel) castors rotatably installed at the front and the rear of the bottom of the loading plate for moving the cart, and a post and a handle installed at the rear of the loading plate, and a user of the cart can load and carry goods within a predetermined range while pushing the handle to rotate the castors.

Recently, as delivery services have become commonplace and warehouses have increasingly become large in size, the need for not only using carts only within a predetermined range, but also loading and moving carts in a transportation vehicle or stacking and storing a considerable number of carts in a warehouse facility, has steadily increased.

Figure 1:
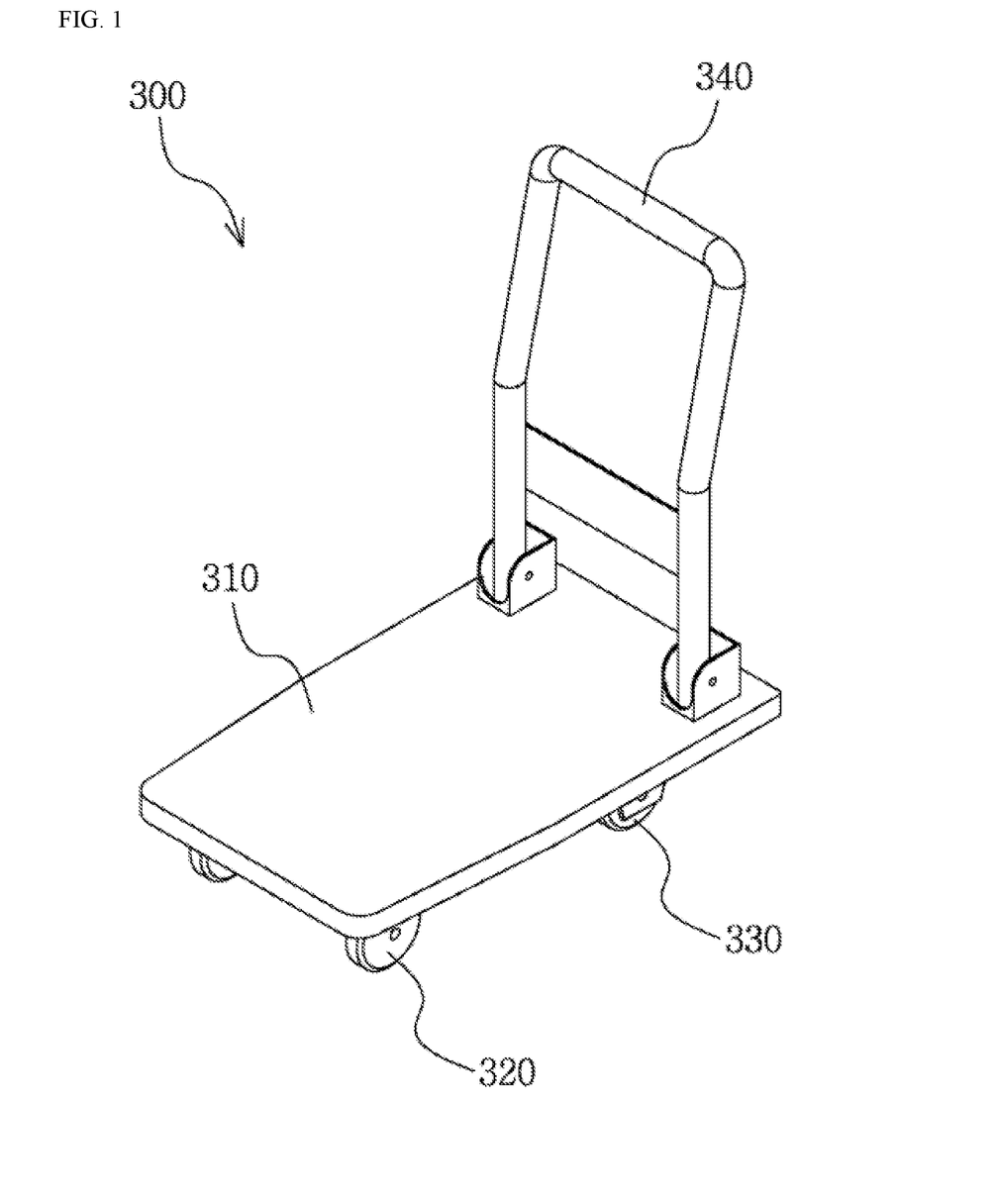
FIG. 1 is a perspective view of a conventional cart.

As illustrated in FIG. 1, a conventional cart, which is a small handcart made to carry goods, includes a loading plate 310 on which goods can be loaded, front wheels 320 and rear wheels 330 mounted at the bottom of the loading plate 320, and a handle 340 supported by the loading plate to extend upwardly. Goods are loaded on the loading plate 310 of the cart 300 and are then carried by pushing or pulling the cart with the handle 340. The front wheels 320 can be rotated 360° and can thus perform a steering role.

The above-mentioned prior art, however, has a disadvantage in that when goods are to be loaded or the cart is to be fixed, an additional device is needed or the cart needs to be propped by an object capable of braking the wheels of the cart because the cart is not provided with a braking device. The non-existence of a braking device in the cart may cause danger, especially when loading and carrying heavy goods.

In addition, since the handle is not foldable, the cart takes up a large space when being moved around, and it is inconvenient to move the cart. Also, even if the handle can be folded, a switch portion for folding the handle is likely to be placed on the loading plate and thus to be accidentally turned on or off by the goods loaded on the loading plate. As a result, a safety accident may be caused.

Moreover, when the cart collides with an obstacle, the cart can escape from the obstacle only by being moved backward and steered forward. Thus, it is difficult to operate the cart properly, especially when heavy goods are loaded. Also, damage to the obstacle may be caused.

Furthermore, since the wheels and parts that connect the loading plate and the wheels are all made of steel, hitting noise is generated and becomes severe over a period of use of the cart, thereby causing inconvenience.

Therefore, the applicant of the present invention has suggested ways to solve the aforementioned problems of the prior art in Korean Patent No. 10-1452757.

The applicant of the present invention will now propose herein an improved braking device of a cart, which is operable with ease and convenience by the foot of a user, based on the techniques disclosed in Korean Patent No. 10-1452757.

DISCLOSURE

Technical Problems

To address the aforementioned problems, exemplary embodiments of the present invention provide a braking device of a portable cart, which has a foot brake pedal, operable in a one-touch manner, at an upper rear side of a loading plate where a handle is installed in the vicinity of a user, in consideration of usability, and can thus allow the cart to be braked with ease and convenience by the foot of a user, prevent the foot brake pedal from being interfered with goods loaded on the loading plate during the driving of the cart, and can visually inform the user of the braking of the cart when the cart is being braked.

Technical Solutions

According to an aspect of the present invention, a braking device of a portable cart includes: a loading plate 2, which is formed to load goods thereon; a pair of front wheels 3 and a pair of rear wheels 10, which are mounted at a lower side of the loading plate 2 to be rotatable; a handle 7, which is supported at an upper side of the loading plate 2, is foldable in a forward direction, and is provided with clamping units 200 so as to maintain a state of being raised upwardly; buffer units 8, which are installed at both front corners of the loading plate 2 and perform buffering and steering functions when the loading board 2 collides with an obstacle; and a braking unit 100, which brakes and controls the rear wheels 10. The braking unit 100 includes: a plurality of engaging grooves 12, which are formed along a rim of a circular recesses 11 formed on an inner side of each of the rear wheels 10 that face each other; a brake bar 20, which is disposed between the rear wheels 10 and controls the rotation of the rear wheels 10 by being selectively received in the engaging grooves 12 with both ends thereof disposed in the recesses 11 facing each other; an actuating link 30, which is penetratingly supported by the brake bar 20 and is connected to a hinge portion 32, installed below the loading plate 2, so as to rotate the brake bar 20; a connecting link 40, which is connected to the actuating link 30 by an interlocking bar 42, fixed at the rear of the actuating link 30, so as to be rotated; a connecting spring 50, which is connected to the brake bar 20 and the interlocking bar 42 so as to elastically maintain a distance between the brake bar 20 and the interlocking bar 42, a push switch 60, which is fixed at an upper side of the connecting link 40 and is supported through the top of the loading plate 2 so as to be vertically lifted up or down on the loading plate 2, and a foot brake pedal 70, which is fixed at an upper side of the push switch 60 and has a top surface exposed at the top of the loading plate 2. During the driving of the rear wheels 10, the top surface of the foot brake pedal 70 is disposed either in line with the top surface of the loading plate 2 or within a protective guide 98, which is formed not to protrude from the loading plate 2. During the braking of the rear wheels 10, the foot brake pedal 70 is projected beyond the upper side of the loading plate 2 or the protective guide 98 and thus visually informs a user that the rear wheels 10 are being braked.

Each of the clamping units 200 may include: a housing 210, which receives a lower end of the handle 7 and is open at the front of the handle 7 so as for the handle 7 to be foldable; a supporting bar 220, which is disposed at a lower side of the lower end of the handle 7 and at the lower side of the loading plate 2 and horizontally penetrates the housing 210; a supporting member 230, which is in the form of a roller, is axially coupled to the supporting bar 220 on the inner side of the housing 210, and is brought in close contact with the lower end of the handle 7; an elastic member 240, which has one side connected to the supporting bar 220 so as for the supporting bar 220 to be elastically lifted up and has the other side fixed to the inner side of the housing 210 at a lower side of the supporting bar 220; a handle folding pedal 250, which is disposed at the rear of the foot brake pedal 70 and is brought in close contact with the top of an actuating rod 221 of the supporting bar 220 so as to press the actuating rod 221 in a downward direction; and an engaging member 260, which extends downwardly from the bottom of the loading plate 2 and has a vertical actuating path 261 formed thereon so as for the actuating rod 221 of the supporting bar 220 to be lifted up or down.

A groove 231, which has a curvature corresponding to a circular cross-sectional shape of the lower end of the handle 7, may be formed in the middle of the supporting member 230, which is in the form of a roller.

A bracket 15 for mounting shaft bolts 14, which support the rotation of the rear wheels 10 on both sides of the rear wheels 10, may be provided at, and extend from, the bottom of the loading plate 2. Actuating slots 16 may be formed on inner brackets 15a, which are located on inner sides of the rear wheels 10, along the trajectory of the brake bar 20, which controls the rotation of the rear wheels 10, as long holes to be penetrated by the brake bar 20.

Actuating slots 43 may be formed on the connecting link 40 to be penetrated by the interlocking bar 42 and to allow the interlocking bar to be flowingly movable therein. The actuating slots 43 may be formed along the trajectory of the interlocking bar 42 as long holes.

Actuating slots 31 may be formed on the actuating link 30 to receive, and be penetrated by, the brake bar 20, and to allow the brake bar 20 to be flowingly movable therein. The actuating slots 31 may be formed along the trajectory of the brake bar 20 as long holes.

The push switch 60 may include: a push block 62, which penetrates from the bottom to the top of the loading plate 2 and is pressed by the user from at the upper side of the loading plate 2; elastic springs 64, which are provided on both sides of the bottom of the push block 62 and press and actuate the connecting link 40; a guide block 66, which is provided in close contact with the sides of the push block 62 and guides the vertical movement of the push block 62; and return springs 68, which are connected between the push block 62 and the guide block 66 so as for the push block 62 to be lifted up or down along the guide block 66.

In the guide block 66, a slant access path 81, along which straight lower end portions 69 of the return springs 68 enter the guide block 66, an engaging path 83, which extends from the slant access path 81 in a horizontal direction, and a return path 85, which extends from the engaging path 83 and is connected to an entrance of the slant access path 81, may be formed.

An engaging recess 84 is formed at an upper side of the engaging path 83 so as for the straight lower end portions 69 of the return springs 68 to be elastically engaged in an upward direction and be stopped.

Advantageous Effects

According to the present invention, since a foot brake pedal, which is operable in a one-touch manner, is provided, in consideration of usability, at an upper rear side of a loading plate where a handle is installed in the vicinity of a user, it is possible to allow a cart to be braked with ease and convenience by the foot of a user, to prevent the foot brake pedal from being interfered with goods loaded on the loading plate during the driving of the cart, and to visually inform the user of the braking of the cart.

In addition, since a handle folding pedal is provided near the foot brake pedal, the user can easily fold the handle over the loading plate using his or her foot, instead of bending the back and using hands.

BEST MODES FOR CARRYING OUT THE INVENTION

Exemplary embodiments of the present invention will hereinafter be described with reference to the accompanying drawings. In the description that follows, detailed descriptions of already well-known functions and configurations that are incorporated herein will be omitted in order not to obscure the subject matter of the present invention. Like reference characters indicate like elements throughout the drawings.

The present invention relates to a braking device of a portable cart, which has a foot brake pedal, operable in a one-touch manner, at an upper rear side of a loading plate where a handle is installed in the vicinity of a user, in consideration of usability, and can thus allow the cart to be braked with ease and convenience by the foot of a user, prevent the foot brake pedal from being interfered with goods loaded on the loading plate during the driving of the cart, and can visually inform the user of the braking of the cart when the cart is being braked, and the braking device includes engaging grooves 12, which are formed in each rear wheel 10, a brake bar 20, an actuating link 30, a connecting link 40, a connecting spring 50, a push switch 60, and a foot brake pedal 70, as illustrated in FIGS. 2 through 12.

Figure 2:
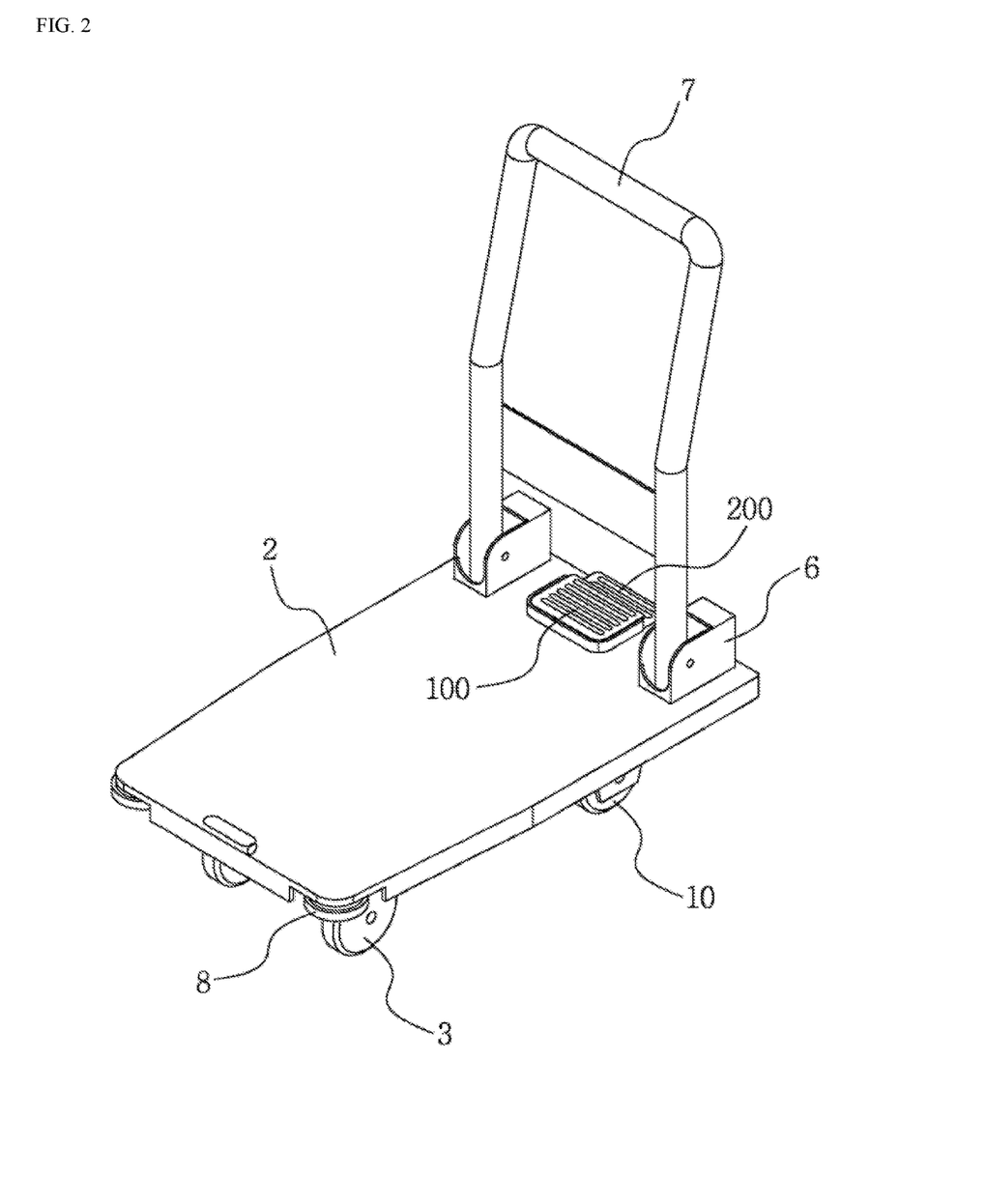
FIG. 2 is a perspective view of a braking device of a portable cart according to the present invention.

As illustrated in FIG. 2, the cart for realizing the present invention includes a loading plate 2 formed so as to be able to load goods thereon, a pair of front wheels 3 and a pair of rear wheels 10, which are rotatably mounted at a lower side of the loading plate 2, a handle 7, which is supported at an upper side of the loading plate 2 and can be folded forward and on which clamping units 6 are mounted so as to maintain the handle 7 in an upright state, buffer units 8, which are installed at both front corners of the loading plate 2 and perform buffering and steering functions when the loading board 2 collides with an obstacle, and a braking unit 100, which brakes and controls the rear wheels 10, and this cart has already been disclosed in Korean Patent No. 10-1452757 by the present applicant.

Typically, a cart includes a loading plate, front wheels and rear wheels having a steering function, and a handle and is a means for transportation of goods within a short-distance range by being loaded with the goods on the loading plate thereof and then being pushed or pulled.

In configuring this type of cart, the loading plate 2 is generally formed as a rectangular plate capable of having goods loaded thereon, as illustrated in FIG. 2, and the handle 7, which is installed at the upper side of the loading plate 2, is vertically fixed on the loading plate 2 while the cart is on the move, but is folded down by the clamping units 6 to be brought in close contact with the top surface of the loading plate 2 when the cart is in storage.

Due to the foldability of the handle 7, another cart can be stacked on the top surface of the loading plate 2, and as a result, many carts can be stored even in a narrow space.

Figure 3:
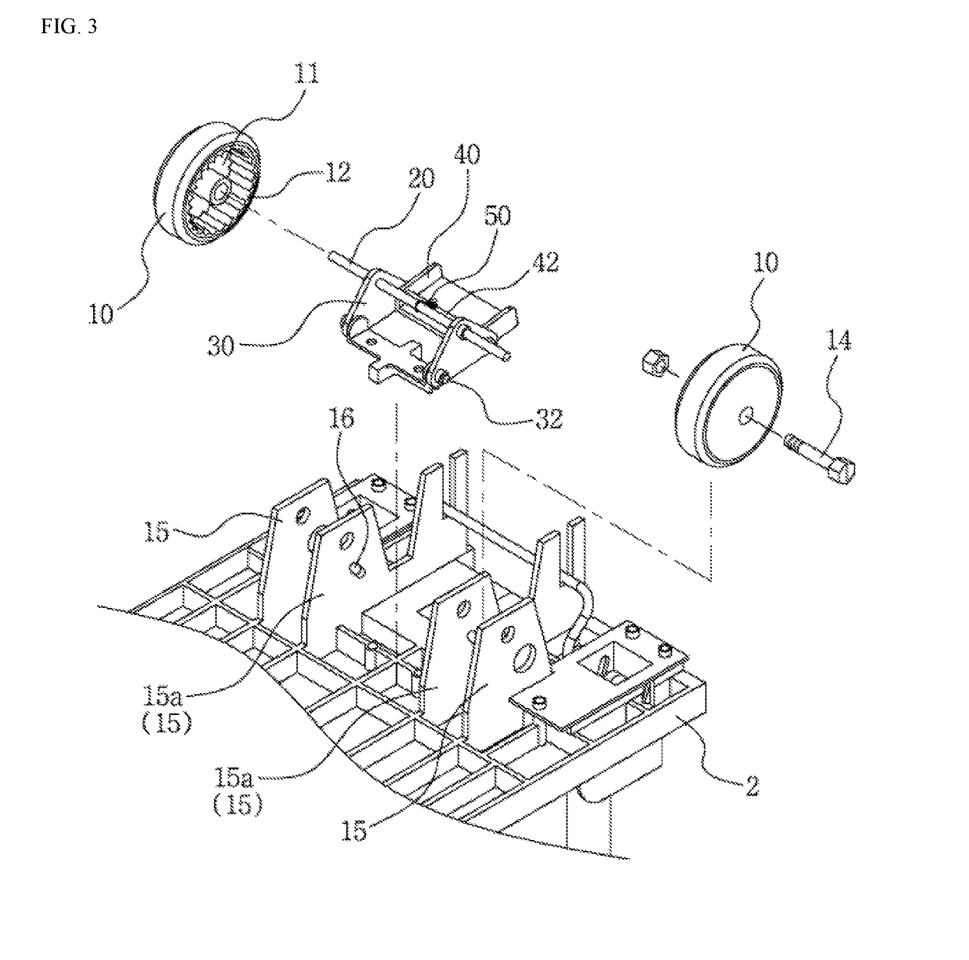
FIG. 3 is a bottom exploded perspective view of a cart according to the present invention.

As illustrated in FIG. 3, the rear wheels 10 are supported and installed at the bottom of the loading plate 2 to be rotatable, circular recesses 11 are respectively formed on the inner sides of the rear wheels 11, which face each other, and a plurality of engaging grooves 12 are formed along the rim of each of the recesses 11.

In one example, the engaging grooves 12 may be semi-circular in shape and may be formed in succession along the rim of each of the recesses 11, and the brake bar 20, which will be described later, may control the rotation of the rear wheels 10 by being selectively received in the engaging grooves 12 in a state where the ends thereof having a circular cross section are disposed in the recesses 11.

In another example, the engaging grooves 12 may be formed at equal intervals along the rim of each of the recesses 11. However, the engaging grooves 12 may preferably be formed in succession, as mentioned above, in order for the brake bar 20 to be operable at any desired location immediately by a user.

Figure 4A:
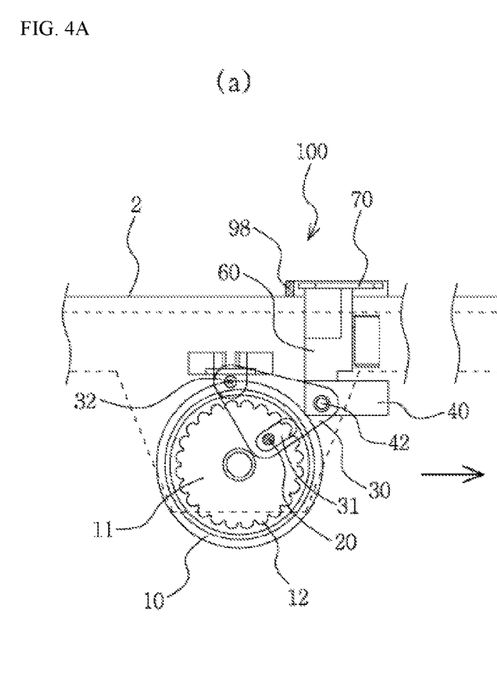
FIGS. 4A and 4B show the operating state of a brake bar according to the present invention.
Figure 4B:
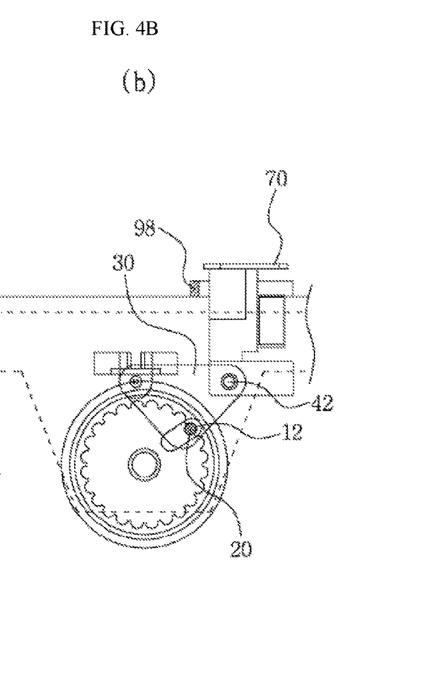

As illustrated in FIGS. 3 and 4, the brake bar 20 is disposed between a pair of rear wheels 10 and is configured to control the rotation of the rear wheels 10 by being selectively received in the engaging grooves 12 with both ends thereof disposed in the recesses 11 on both sides of the rear wheels 10.

As illustrated in FIG. 3, in order to realize this configuration, the brake bar 20 is installed to penetrate the actuating link 30, which is connected to a hinge portion 32 provided at the bottom of the loading plate 2, and the actuating link 30 is connected to the connecting link 40 at the rear thereof. An interlocking bar 42 is penetratingly connected between the actuating link 30 and the connecting link 40 so that the actuating link 30 and the connecting link 40 can be pivoted about the interlocking bar 42.

A connecting spring 50 is connected between the brake bar 20 and the interlocking bar 42 so that the distance between the brake bar 20 and the interlocking bar 42 can be elastically maintained.

As illustrated in FIG. 4, the push switch 60 is fixedly installed at the upper side of the connecting link 40. The push switch 60 is fixedly installed at the upper side of the connecting link 40 and is supported through the top of the loading plate 2 so as to be vertically lifted up or down on the loading plate 2.

Figure 5:
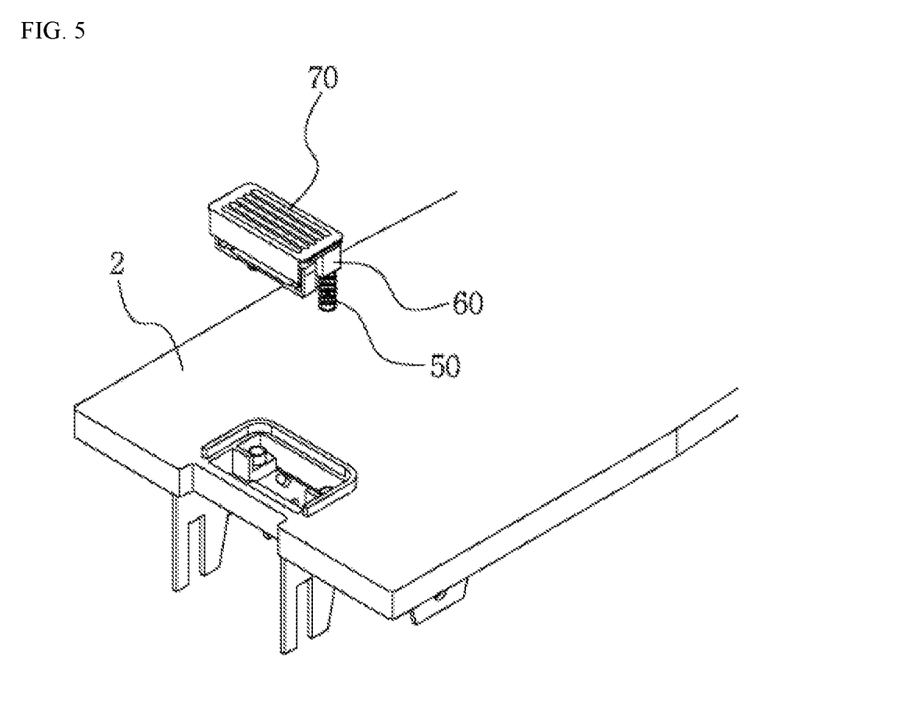
FIG. 5 shows how to install a foot brake pedal according to the present invention.

As illustrated in FIG. 4, the foot brake pedal 70 is fixedly installed at the upper side of the push switch 60. As illustrated in FIGS. 2 and 5, the foot brake pedal 70 is disposed in such a manner that the top surface thereof can be exposed on the loading plate 2 in order for the user to easily step on and press the foot brake pedal 70 from outside the loading plate 2.

As illustrated in FIG. 4(a), during the driving of the rear wheels 10, the foot brake pedal 70 preferably does not protrude from the top surface of the loading plate 2 in order not to interfere with goods loaded on the loading plate 2. To this end, the top surface of the foot brake pedal 70 may be disposed in line with the top surface of the loading plate 2 and may preferably be disposed within a protective guide 98 of the foot brake pedal 98, which protrudes from the loading plate 2, as illustrated in FIG. 4(a).

As illustrated in FIG. 4 (b), during the braking of the rear wheels 10, the foot brake pedal 70 is projected beyond the upper side of the loading plate 2 or the protective guide 98 and thus visually informs the user that the rear wheels 10 are being braked.

As illustrated in FIG. 3, a bracket 15 for mounting shaft bolts 14, which support the rotation of the rear wheels 10 on both sides of the rear wheels 10, is provided at, and extends from, the bottom of the loading plate 2, and actuating slots 16 are formed on inner brackets 15a, which are located on the inner sides of the rear wheels 10, along the trajectory of the brake bar 20, which controls the rotation of the rear wheels 10, as long holes to be penetrated by the brake bar 20.

As illustrated in FIG. 4, actuating slots 31 are formed on the actuating link 30 to receive, and be penetrated by, the brake bar 20, and to allow the brake bar 20 to be flowingly movable therein. The actuating slots 31 may preferably be formed along the trajectory of the brake bar 20 as long holes.

Figure 6:
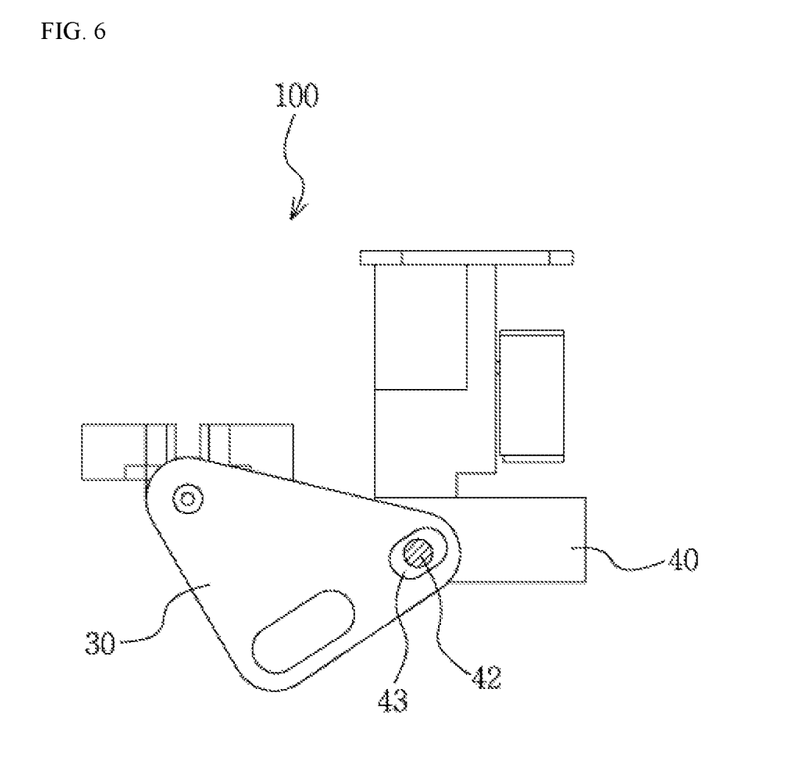
FIG. 6 shows operations of an interlocking bar and an actuating slot according to the present invention.

Similarly, as illustrated in FIG. 6, actuating slots 43 are formed on the connecting link 40 to be penetrated by the interlocking bar 42 and to allow the interlocking bar to be flowingly movable therein. The actuating slots 43 may preferably be formed along the trajectory of the interlocking bar 42 as long holes.

Figure 7:
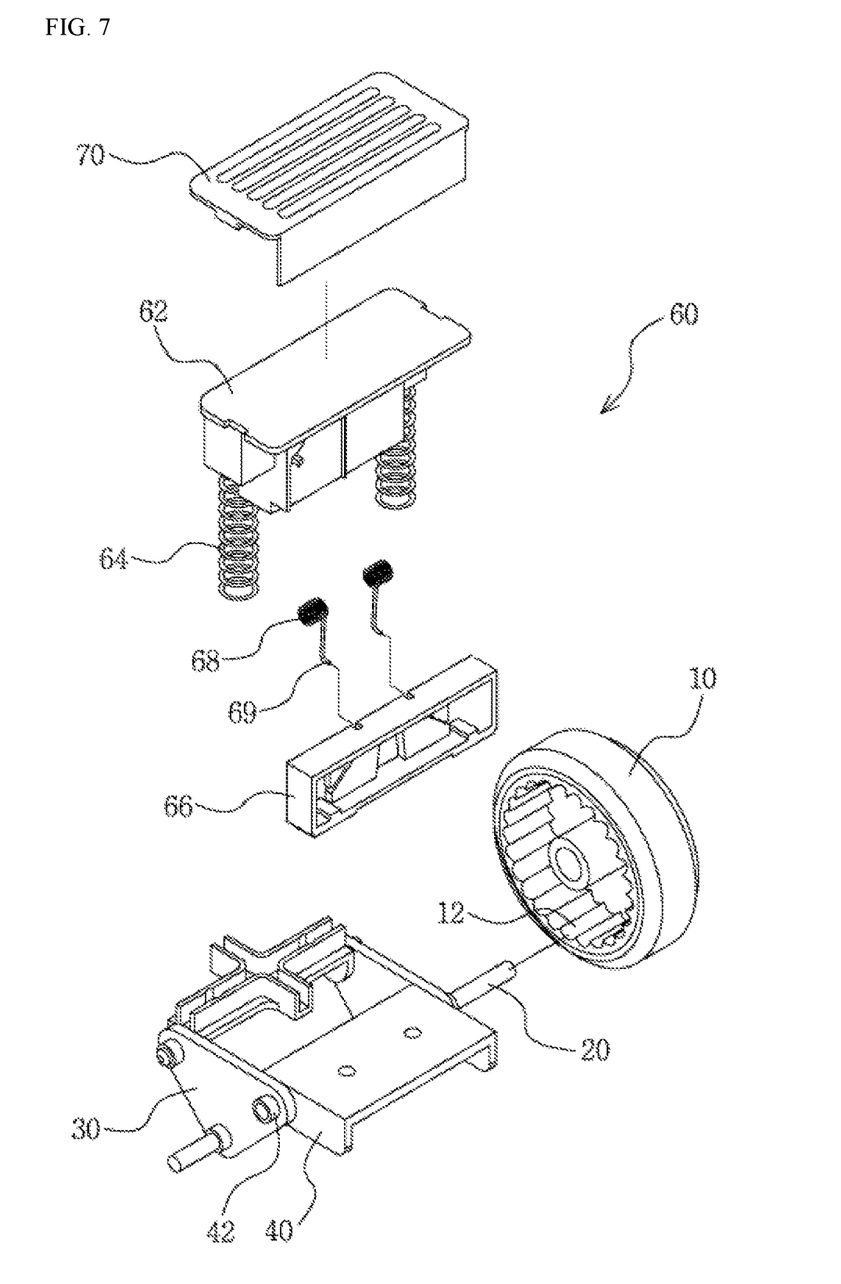
FIG. 7 is an exploded perspective view of major parts according to the present invention.

As illustrated in FIG. 7, the push switch 60, which is fixed to the upper side of the connecting link 40 and is supported through the top of the loading plate 2 to be vertically lifted up or down on the loading plate 2, includes a push block 62, which penetrates from the bottom to the top of the loading plate 2 and is pressed by the user from at the upper side of the loading plate 2, elastic springs 64, which are provided on both sides of the bottom of the push block 62 and press and actuate the connecting link 40, a guide block 66, which is provided in close contact with the sides of the push block 62 and guides the vertical movement of the push block 62, and return springs 68, which are connected between the push block 62 and the guide block 66 so as for the push block 62 to be lifted up or down along the guide block 66.

Figure 8A:
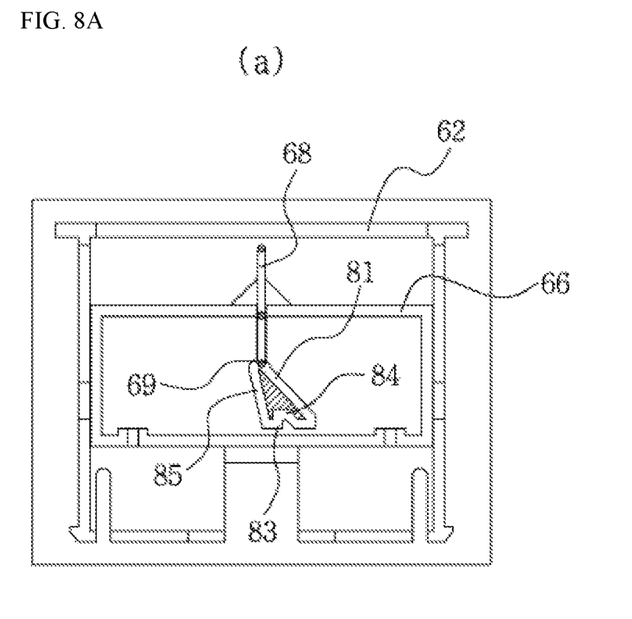
FIGS. 8A and 8B show the internal structure of a push switch according to the present invention.
Figure 8B:
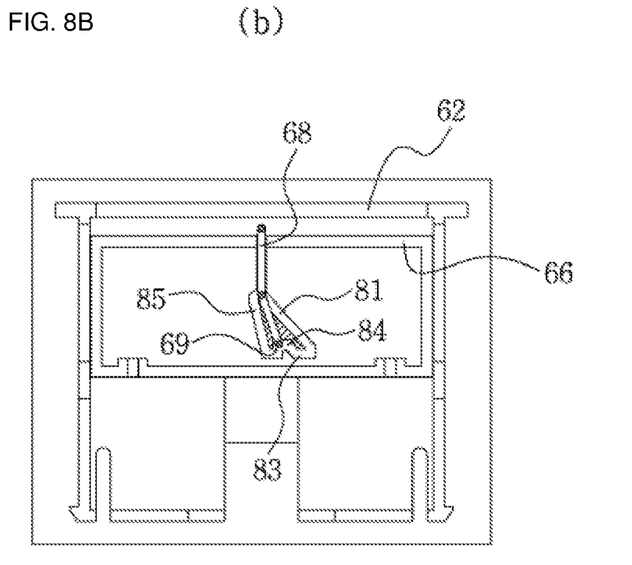

As illustrated in FIG. 8, in the guide block 66, a slant access path 81, along which straight lower end portions 69 of the return springs 68 enter the guide block 66, an engaging path 83, which extends from the slant access path 81 in a horizontal direction, and a return path 85, which extends from the engaging path 83 and is connected to the entrance of the slant access path 81, are formed.

An engaging recess 84 is formed at an upper side of the engaging path 83 so as for the straight lower end portions 69 of the return springs 68 to be elastically engaged in an upward direction and be stopped.

The operation of the braking device of the portable cart according to the present invention will hereinafter be described.

As illustrated in FIG. 2 and the left side of FIG. 4, when the foot brake pedal 70 is in a lowered position, the ends of the brake bar 20 are located in the recesses 11 of the rear wheels 10, and thus, the rear wheels 10 are rotated. In this case, the straight lower end portions 69 of the return springs 68, which are connected to the push block 62 of the push switch 60, are in a state of being caught in the engaging recess 84, as illustrated in FIG. 9(③).

Figure 9:
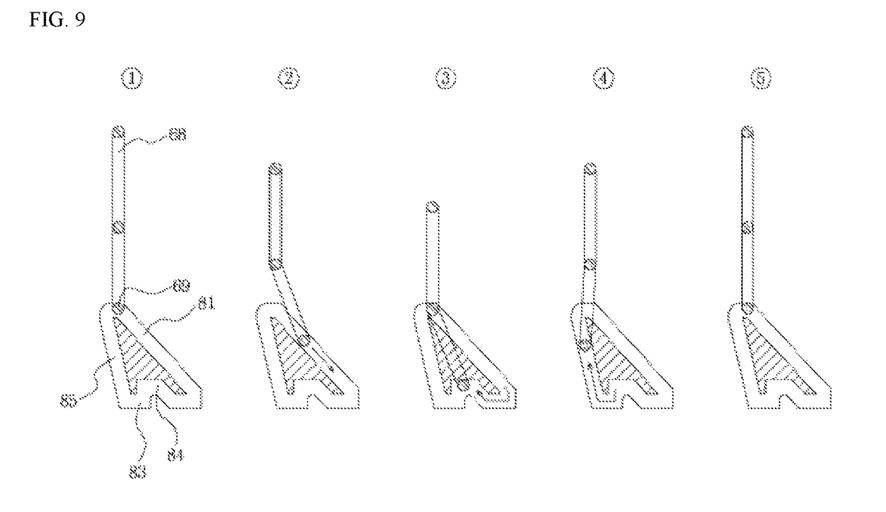
FIG. 9 shows the sequence of operations of the push switch according to the present invention.

Then, if the foot brake pedal 70 is pressed in a one-touch manner in order to brake the rear wheels 10, the straight lower end portions 69 of the return springs 68, caught in the engaging recess 84, are elastically actuated and escape from the engaging path 83 to move up along the return path 85, as illustrated in FIG. 9(④), and are placed at a top dead point, which is the point of contact between the return path 85 and the slant access path 81, as illustrated in FIG. 9(⑤).

In this case, as illustrated in the right side of FIG. 4, the foot brake pedal 70 is lifted up, and at the same time, the ends of the brake bar 20, located in the recesses 11 of the rear wheels 10, move along the actuating slots 16, which are formed on the inner brackets 15a as long holes, and are received in the engaging grooves 12 of the rear wheels 10, thereby controlling the rotation of the rear wheels 10.

In order to release the rear wheels 10 from a rotation-controlled state, the foot brake pedal 70 needs to be pressed in the same manner described above. In this case, the straight lower end portions 69 of the return springs 68, located at the top dead point, which is the point of contact between the return path 85 and the slant access path 81, as illustrated in FIG. 9(①), move down along the slant access path 81, as illustrated in FIG. 9(②). Then, the straight lower end portions 69 of the return springs 68 enter the engaging path 83 through a bottom dead point of the slant access path 81 and are caught in the engaging recess 84, as illustrated in FIG. 9(③).

In this case, as illustrated in the left side of FIG. 4, the foot brake pedal 70 is lifted down, and at the same time, the ends of the brake bar 20, received in the recesses 11 of the rear wheels 10, move along the actuating slots 16, which are formed on the inner bracket parts 15a as long holes, escape from the engaging grooves 12 of the rear wheels 10, and are then placed in the recesses 11, thereby releasing the rotation of the rear wheels 10.

Figure 10:
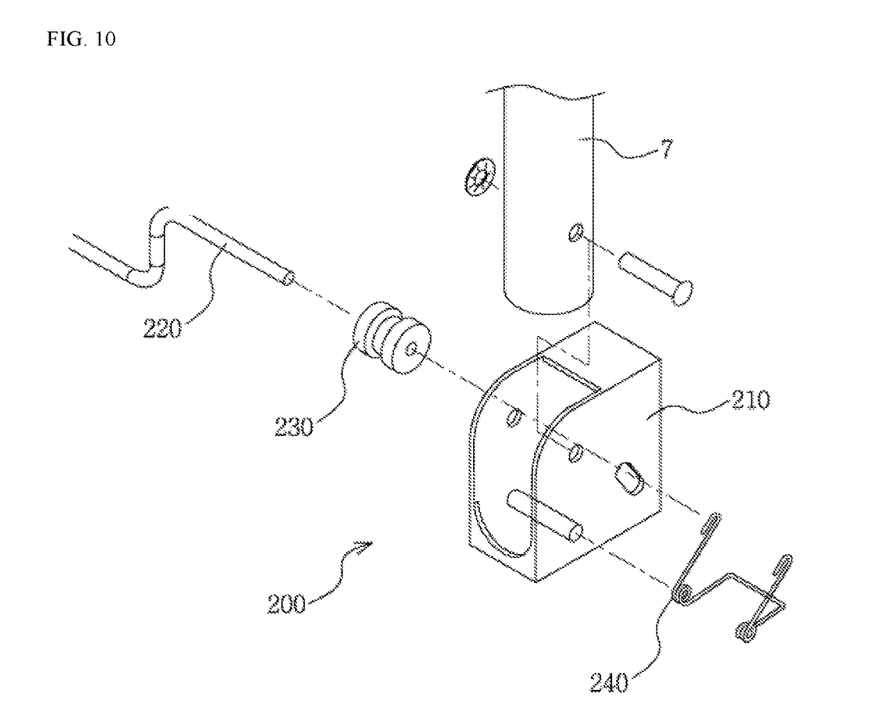
FIGS. 10 through 11 show a clamping unit according to the present invention.
Figure 11:
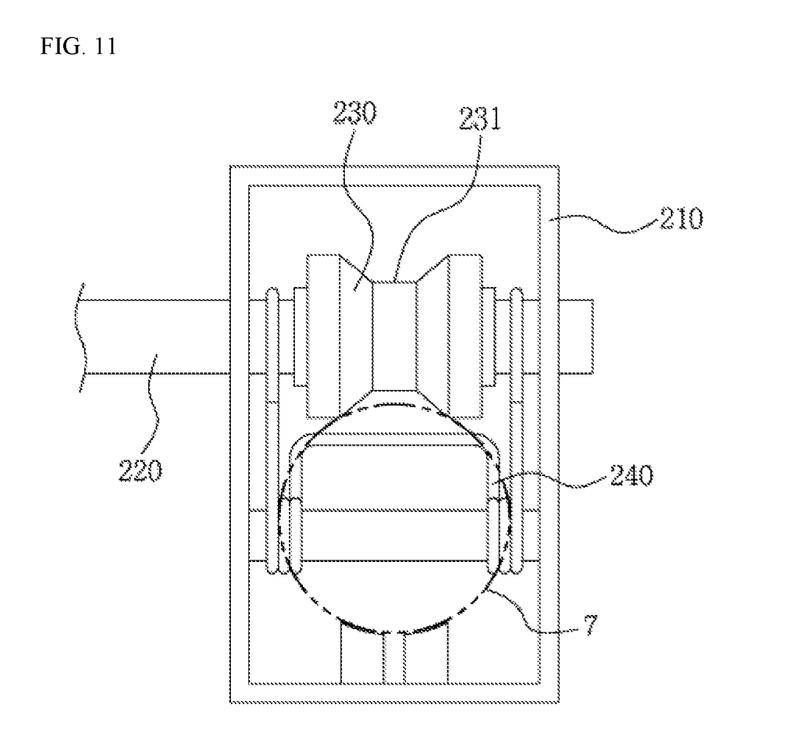

As illustrated in FIGS. 10 and 11, a clamping unit 200, which is formed at the braking device of the portable cart according to the present invention, includes a housing 210, which receives a lower end of the handle 7 and is open at the front of the handle 7 so as for the handle 7 to be foldable, a supporting bar 220, which is disposed at a lower side of the lower end of the handle 7 and at the lower side of the loading plate 2 and horizontally penetrates the housing 210, a supporting member 230, which is in the form of a roller, is axially coupled to the supporting bar 220 on the inner side of the housing 210, and is brought in close contact with the lower end of the handle 7, an elastic member 240, which has one side connected to the supporting bar 220 so as for the supporting bar 220 to be elastically lifted up and has the other side fixed to the inner side of the housing 210 at a lower side of the supporting bar 220, a handle folding pedal 250, which is disposed at the rear of the foot brake pedal 70 and is brought in close contact with the top of an actuating rod 221 of the supporting bar 220 to press the actuating rod 221 in a downward direction, and an engaging member 260, which extends downwardly from the bottom of the loading plate 2 and has a vertical actuating path 261 formed thereon so as for the actuating rod 221 of the supporting bar 220 to be lifted up or down.

As illustrated in FIG. 11, a groove 231, which has a curvature corresponding to the circular cross-sectional shape of the lower end of the handle 7, may preferably be formed in the middle of the supporting member 230, which is in the form of a roller.

Referring to FIG. 12, if the user steps on the handle folding pedal 250 when the supporting bar 220 is raised upright on the loading plate 2, as illustrated in FIG. 12(a), the supporting bar 220, which is brought in close contact with the bottom surface of the handle folding pedal 250, is lifted down along an actuating path 261 of the engaging member 260, as illustrated in FIG. 12(b), and as a result, the supporting member 230, which is supported in close contact with the end of the handle 7, is lifted down together with the supporting bar 220, thereby releasing the support of the end of the handle 7. Accordingly, the handle 7 can be folded.

Also, as illustrated in FIG. 12(c), due to the returning elastic force of the elastic member 240, the supporting member 230 is lifted up to its original position and can thus support the end of the folded handle 7, thereby stably maintaining the folded state of the handle 7.

On the other hand, the handle 7 can be raised back to its upright position on the loading plate 2 simply by rotating the handle 7 in a direction opposite to the direction in which the handle 7 is folded.

INDUSTRIAL APPLICABILITY

According to the present invention, since a foot brake pedal, which is operable in a one-touch manner, is provided, in consideration of usability, at an upper rear side of a loading plate where a handle is installed in the vicinity of a user, it is possible to allow a cart to be braked with ease and convenience by the foot of a user, to prevent the foot brake pedal from being interfered with goods loaded on the loading plate during the driving of the cart, and to visually inform the user of the braking of the cart.

In addition, since a handle folding pedal is provided near the foot brake pedal, the user can easily fold the handle over the loading plate using his or her foot, instead of bending the back and using hands.

What is claimed is:
1. A braking device of a portable cart, comprising:
    a loading plate 2, which is formed to load goods thereon;
    a pair of front wheels 3 and a pair of rear wheels 10, which are mounted at a lower side of the loading plate 2 to be rotatable;
    a handle 7, which is supported at an upper side of the loading plate 2, is foldable in a forward direction, and is provided with clamping units 200 so as to maintain a state of being raised upwardly;

buffer units 8, which are installed at both front corners of the loading plate 2 and perform buffering and steering functions when the loading board 2 collides with an obstacle; and a braking unit 100, which brakes and controls the rear wheels 10, wherein the braking unit 100 includes: a plurality of engaging grooves 12, which are formed along a rim of a circular recesses 11 formed on an inner side of each of the rear wheels 10 that face each other; a brake bar 20, which is disposed between the rear wheels 10 and controls the rotation of the rear wheels 10 by being selectively received in the engaging grooves 12 with both ends thereof disposed in the recesses 11 facing each other; an actuating link 30, which is penetratingly supported by the brake bar 20 and is connected to a hinge portion 32, installed below the loading plate 2, so as to rotate the brake bar 20; a connecting link 40, which is connected to the actuating link 30 by an interlocking bar 42, fixed at the rear of the actuating link 30, so as to be rotated; a connecting spring 50, which is connected to the brake bar 20 and the interlocking bar 42 so as to elastically maintain a distance between the brake bar 20 and the interlocking bar 42, a push switch 60, which is fixed at an upper side of the connecting link 40 and is supported through the top of the loading plate 2 so as to be vertically lifted up or down on the loading plate 2, and a foot brake pedal 70, which is fixed at an upper side of the push switch 60 and has a top surface exposed at the top of the loading plate 2, during the driving of the rear wheels 10, the top surface of the foot brake pedal 70 is disposed either in line with the top surface of the loading plate 2 or within a protective guide 98, which is formed not to protrude from the loading plate 2, and during the braking of the rear wheels 10, the foot brake pedal 70 is projected beyond the upper side of the loading plate 2 or the protective guide 98 and thus visually informs a user that the rear wheels 10 are being braked.

2. The braking device of claim 1, wherein each of the clamping units 200 includes: a housing 210, which receives a lower end of the handle 7 and is open at the front of the handle 7 so as for the handle 7 to be foldable; a supporting bar 220, which is disposed at a lower side of the lower end of the handle 7 and at the lower side of the loading plate 2 and horizontally penetrates the housing 210; a supporting member 230, which is in the form of a roller, is axially coupled to the supporting bar 220 on the inner side of the housing 210, and is brought in close contact with the lower end of the handle 7; an elastic member 240, which has one side connected to the supporting bar 220 so as for the supporting bar 220 to be elastically lifted up and has the other side fixed to the inner side of the housing 210 at a lower side of the supporting bar 220; a handle folding pedal 250, which is disposed at the rear of the foot brake pedal 70 and is brought in close contact with the top of an actuating rod 221 of the supporting bar 220 so as to press the actuating rod 221 in a downward direction; and an engaging member 260, which extends downwardly from the bottom of the loading plate 2 and has a vertical actuating path 261 formed thereon so as for the actuating rod 221 of the supporting bar 220 to be lifted up or down.

3. The braking device of claim 2, wherein a groove 231, which has a curvature corresponding to a circular cross-sectional shape of the lower end of the handle 7, is formed in the middle of the supporting member 230, which is in the form of a roller.

4. The braking device of claim 1, wherein a bracket 15 for mounting shaft bolts 14, which support the rotation of the rear wheels 10 on both sides of the rear wheels 10, is provided at, and extends from, the bottom of the loading plate 2, and actuating slots 16 are formed on inner brackets 15a, which are located on inner sides of the rear wheels 10, along the trajectory of the brake bar 20, which controls the rotation of the rear wheels 10, as long holes to be penetrated by the brake bar 20.

5. The braking device of claim 1, wherein actuating slots 43 are formed on the connecting link 40 to be penetrated by the interlocking bar 42 and to allow the interlocking bar to be flowingly movable therein, and the actuating slots 43 are formed along the trajectory of the interlocking bar 42 as long holes.

6. The braking device of claim 1, wherein actuating slots 31 are formed on the actuating link 30 to receive, and be penetrated by, the brake bar 20, and to allow the brake bar 20 to be flowingly movable therein, and the actuating slots 31 are formed along the trajectory of the brake bar 20 as long holes.

7. The braking device of claim 1, wherein the push switch 60 includes: a push block 62, which penetrates from the bottom to the top of the loading plate 2 and is pressed by the user from at the upper side of the loading plate 2; elastic springs 64, which are provided on both sides of the bottom of the push block 62 and press and actuate the connecting link 40; a guide block 66, which is provided in close contact with the sides of the push block 62 and guides the vertical movement of the push block 62; and return springs 68, which are connected between the push block 62 and the guide block 66 so as for the push block 62 to be lifted up or down along the guide block 66.

8. The braking device of claim 7, wherein in the guide block 66, a slant access path 81, along which straight lower end portions 69 of the return springs 68 enter the guide block 66, an engaging path 83, which extends from the slant access path 81 in a horizontal direction, and a return path 85, which extends from the engaging path 83 and is connected to an entrance of the slant access path 81, are formed.

9. The braking device of claim 8, wherein an engaging recess 84 is formed at an upper side of the engaging path 83 so as for the straight lower end portions 69 of the return springs 68 to be elastically engaged in an upward direction and be stopped.

* * * * *